US008850532B2

(12) United States Patent
Belz et al.

(10) Patent No.: US 8,850,532 B2
(45) Date of Patent: Sep. 30, 2014

(54) SYSTEMS AND METHODS TO CONTROL ACCESS TO MULTIMEDIA CONTENT

(75) Inventors: Steven Belz, Cedar Park, TX (US); Marc Sullivan, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 937 days.

(21) Appl. No.: 12/262,602

(22) Filed: Oct. 31, 2008

(65) Prior Publication Data

US 2010/0115592 A1      May 6, 2010

(51) Int. Cl.
| | |
|---|---|
| G06F 15/16 | (2006.01) |
| G06F 15/17 | (2006.01) |
| G06F 21/40 | (2013.01) |
| G06F 21/10 | (2013.01) |
| G06F 21/35 | (2013.01) |
| H04L 29/06 | (2006.01) |
| H04N 5/44 | (2011.01) |
| H04N 7/16 | (2011.01) |
| H04N 21/40 | (2011.01) |
| H04M 1/66 | (2006.01) |

(52) U.S. Cl.
CPC ............... *G06F 15/16* (2013.01); *G06F 15/17* (2013.01); *G06F 21/40* (2013.01); *G06F 21/10* (2013.01); *G06F 21/35* (2013.01); *H04L 63/08* (2013.01); *H04L 63/10* (2013.01); *H04N 5/4403* (2013.01); *H04N 7/163* (2013.01); *H04N 21/40* (2013.01); *H04M 1/66* (2013.01)
USPC .......................................................... 726/5

(58) Field of Classification Search
CPC ...... G06F 21/40; H04L 63/10; H04N 5/4403; H04N 7/163

USPC ............................................................ 726/5
See application file for complete search history.

(56) References Cited

U.S. PATENT DOCUMENTS

| | | | |
|---|---|---|---|
| 5,555,376 | A | 9/1996 | Theimer et al. |
| 6,609,113 | B1 | 8/2003 | O'Leary et al. |
| 6,865,555 | B2 | 3/2005 | Novak |
| 6,868,391 | B1 * | 3/2005 | Hultgren ........................ 705/17 |
| 7,046,139 | B2 | 5/2006 | Kuhn et al. |
| 7,558,407 | B2 * | 7/2009 | Hoffman et al. ............. 382/115 |
| 7,778,189 | B2 * | 8/2010 | Valli et al. ..................... 370/244 |

(Continued)

OTHER PUBLICATIONS

Antoniou et al., "NFC-Based Mobile Middleware for Inituitive User Interaction with Security in Smart Homes".*

(Continued)

*Primary Examiner* — Ondrej Vostal
(74) *Attorney, Agent, or Firm* — Toler Law Group, PC

(57) ABSTRACT

Systems and methods to control access to multimedia are disclosed. A method includes receiving a request for multimedia content at a computing device, retrieving a destination address of a mobile communication device related to an authorized user of the computing device and determining whether the mobile communication device is located within a predetermined distance from the computing device. When the mobile communication device is located within the communicative distance from the computing device, the multimedia content is received at the computing device. When the mobile communication device is not located within the communicative distance from the computing device, an authorization-request message is transmitted via a network to the destination address of the mobile communication device, wherein the authorization-request message includes a request for authorization to receive the multimedia content at the computing device.

24 Claims, 5 Drawing Sheets

(56) References Cited

U.S. PATENT DOCUMENTS

| | | |
|---|---|---|
| 7,801,168 B2 * | 9/2010 | Trainin .................... 370/447 |
| 7,991,697 B2 * | 8/2011 | Fransdonk .................... 705/51 |
| 2003/0061606 A1 | 3/2003 | Hartwig et al. |
| 2004/0005045 A1 * | 1/2004 | Adams et al. ............ 379/201.02 |
| 2004/0015985 A1 | 1/2004 | Kweon |
| 2004/0152482 A1 * | 8/2004 | Raffel et al. .................. 455/522 |
| 2004/0218609 A1 * | 11/2004 | Foster et al. .................. 370/401 |
| 2005/0066353 A1 * | 3/2005 | Fransdonk .................... 725/29 |
| 2005/0234735 A1 * | 10/2005 | Williams ........................ 705/1 |
| 2006/0109967 A1 * | 5/2006 | Kouchri et al. .......... 379/207.02 |
| 2006/0153075 A1 * | 7/2006 | Whitehill et al. ............. 370/230 |
| 2006/0168307 A1 * | 7/2006 | Kontothanassis et al. .... 709/232 |
| 2006/0219776 A1 | 10/2006 | Finn |
| 2006/0235800 A1 * | 10/2006 | Furlong et al. .................. 705/59 |
| 2007/0022437 A1 * | 1/2007 | Gerken ............................ 725/41 |
| 2007/0028258 A1 | 2/2007 | Wollmershauser |
| 2007/0050836 A1 * | 3/2007 | Stanek et al. ................. 725/131 |
| 2007/0076872 A1 * | 4/2007 | Juneau ........................... 380/202 |
| 2007/0083895 A1 | 4/2007 | McCarthy et al. |
| 2007/0107017 A1 | 5/2007 | Angel et al. |
| 2007/0107019 A1 * | 5/2007 | Romano et al. ................. 725/80 |
| 2007/0173266 A1 * | 7/2007 | Barnes, Jr. .................. 455/456.1 |
| 2007/0199025 A1 | 8/2007 | Angiolillo et al. |
| 2007/0273558 A1 * | 11/2007 | Smith et al. ................. 340/995.1 |
| 2008/0014869 A1 * | 1/2008 | Demirbasa et al. ........... 455/41.2 |
| 2008/0015988 A1 * | 1/2008 | Brown et al. .................... 705/44 |
| 2008/0032629 A1 * | 2/2008 | Wang et al. ................... 455/41.2 |
| 2008/0104181 A1 * | 5/2008 | Golan ............................ 709/206 |
| 2008/0105751 A1 * | 5/2008 | Landau ......................... 235/492 |
| 2008/0108324 A1 * | 5/2008 | Moshir et al. ................. 455/411 |
| 2008/0126561 A1 * | 5/2008 | Ryu et al. ...................... 709/234 |
| 2008/0134237 A1 * | 6/2008 | Tu et al. ........................... 725/38 |
| 2008/0134274 A1 * | 6/2008 | Derrenberger et al. ....... 725/131 |
| 2008/0155685 A1 * | 6/2008 | Beilinson et al. ............... 726/21 |
| 2008/0207124 A1 * | 8/2008 | Raisanen et al. ............. 455/41.2 |
| 2008/0214111 A1 * | 9/2008 | Moshir et al. ................ 455/41.2 |
| 2008/0219241 A1 * | 9/2008 | Leinonen et al. ............. 370/352 |
| 2008/0222705 A1 * | 9/2008 | Goodmon et al. ................ 726/4 |
| 2008/0238610 A1 * | 10/2008 | Rosenberg .................... 340/5.7 |
| 2008/0244148 A1 * | 10/2008 | Nix et al. ....................... 710/313 |
| 2008/0292074 A1 * | 11/2008 | Boni et al. .................. 379/93.11 |
| 2009/0069050 A1 * | 3/2009 | Jain et al. ....................... 455/558 |
| 2009/0070691 A1 * | 3/2009 | Jain ................................ 715/760 |
| 2009/0088153 A1 * | 4/2009 | Krause et al. ................. 455/433 |
| 2009/0113512 A1 * | 4/2009 | Collet et al. ................... 725/132 |
| 2009/0157473 A1 * | 6/2009 | Belz et al. ....................... 705/10 |
| 2009/0165053 A1 * | 6/2009 | Thyagarajan et al. .......... 725/46 |
| 2009/0168695 A1 * | 7/2009 | Johar et al. .................... 370/328 |
| 2009/0178093 A1 * | 7/2009 | Mitsuji et al. ................. 725/104 |
| 2009/0187492 A1 * | 7/2009 | Hammad et al. ................ 705/26 |
| 2009/0191811 A1 * | 7/2009 | Griffin et al. ................. 455/41.1 |
| 2009/0192935 A1 * | 7/2009 | Griffin et al. ................... 705/41 |
| 2009/0192937 A1 * | 7/2009 | Griffin et al. ................... 705/42 |
| 2009/0193500 A1 * | 7/2009 | Griffin et al. ..................... 726/2 |
| 2009/0247208 A1 * | 10/2009 | Lohmar et al. ................ 455/519 |
| 2009/0249418 A1 * | 10/2009 | Alastruey Gracia et al. . 725/114 |
| 2009/0254485 A1 * | 10/2009 | Baentsch et al. ................ 705/71 |
| 2010/0042546 A1 * | 2/2010 | Humbel ........................... 705/64 |
| 2010/0049599 A1 * | 2/2010 | Owen et al. .................. 705/14.4 |
| 2010/0058395 A1 * | 3/2010 | Goergen et al. ................. 725/58 |
| 2010/0082429 A1 * | 4/2010 | Samdadiya et al. ....... 705/14.49 |
| 2010/0112942 A9 * | 5/2010 | Cannon et al. ............... 455/41.2 |
| 2010/0131633 A1 * | 5/2010 | Herlein et al. ................. 709/223 |
| 2010/0153730 A1 * | 6/2010 | Goria ............................. 713/173 |
| 2010/0184372 A1 * | 7/2010 | Tabaaloute ................... 455/41.1 |
| 2011/0053560 A1 * | 3/2011 | Jain et al. ...................... 455/411 |

OTHER PUBLICATIONS

ECMA International, "Standard ECMA-340: Near Field Communication Interface and Protocol (NFCIP-1)" 2004.*
ECMA International, "Standard ECMA-356: NFCIP-1—RF Interface Test Methods", 2004.*
Roduner et al., "Operating Applicances with Mobile Phones—Strengths and Limits of a Universal Interaction Device", 2007.*
Bravo et al., "Enabling NFC Technology for Supporting Chronic Diseases: A Proposal for Alzheimer Caregivers", 2008.*
Sanchez et al., "Controlling Multimedia Players using NFC Enabled Mobile Phones", 2007.*
Newman et al., "Protecting Domestic Power-line Communications", 2006.*
Noll, "Services and Applications in Future Wireless Networks", 2006.*
Wilcox, "What's next in mobile telephony and will it succeed?", 2005.*
Csapodi, "New Applications for NFC Devices", 2007.*
Antoniou et al., "NTF-Based Mobile Middleware for Intuitive User Interaction with Security in Smart Homes", 2006.*
Wikipedia, Near Field Communication, (5pgs).
Nokia, 2008, www.europe.nokia.com/A4153291, (2 pgs).
Wikipedia, Customer-premises equipment, (1pg).
Wikipedia, Bluetooth, (1pg).
Gemalto & Near Field Communication (NFC), NFC deployment in the mobile world, www.gemalto.com, (1pg).

* cited by examiner

SYSTEMS AND METHODS TO CONTROL ACCESS TO MULTIMEDIA CONTENT

FIELD OF THE DISCLOSURE

The present disclosure relates generally to controlling access to multimedia content.

BACKGROUND

Parental controls, and other access controls, exist to prevent access to certain types of multimedia content, such as certain video services. For example, a parent may wish to limit the multimedia content that their children can view to a subset of available channels. Video access plans may allow a potential viewer to enter a passcode at a device delivering the multimedia content in order to view particular channels. For example, a video service may allow a subscriber to choose a passcode that must be entered at a set top box to enable the set top box to receive premium channels.

DETAILED DESCRIPTION

Figure 1:
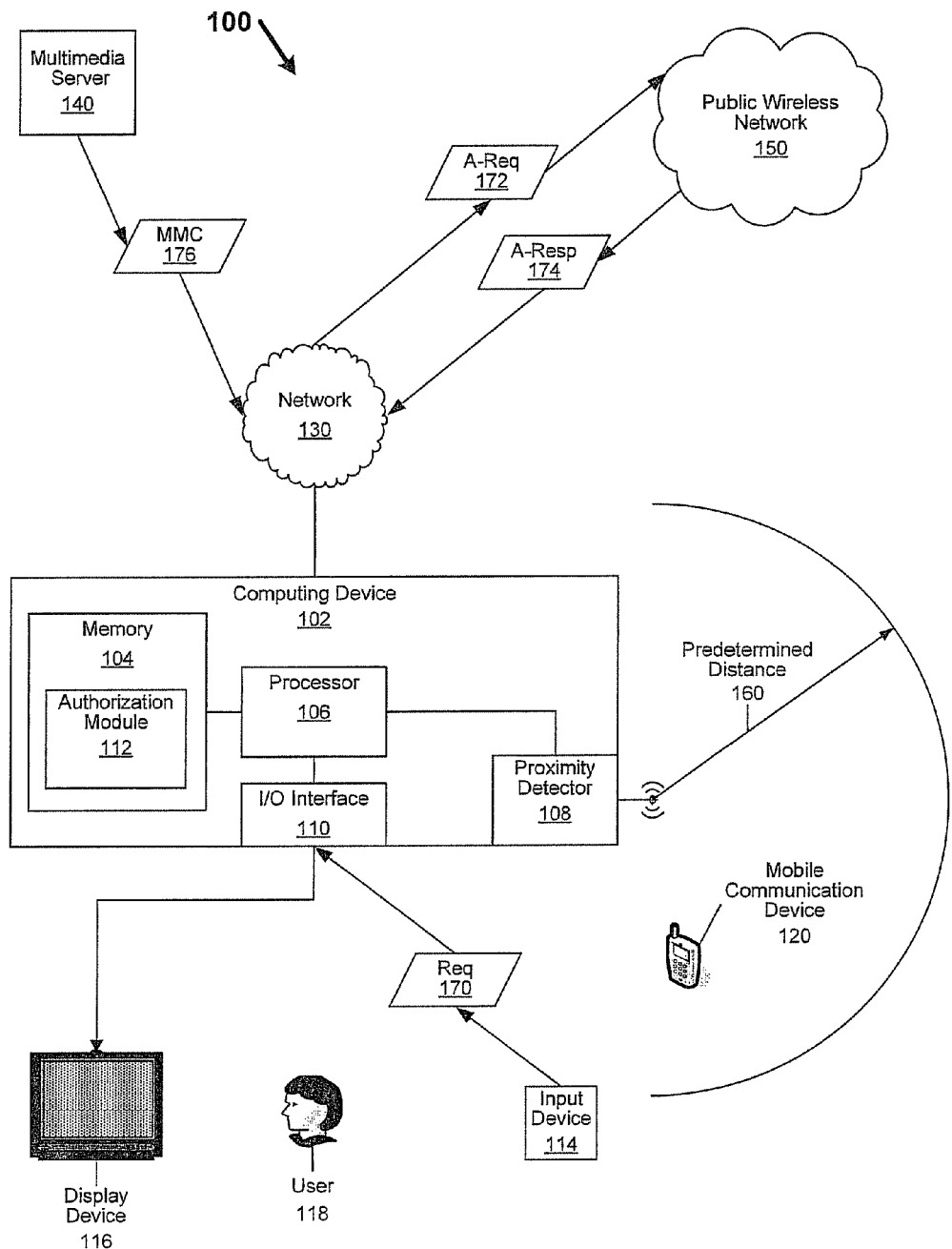
FIG. 1 is a diagram of an embodiment of a system to control access to multimedia content at a computing device.

Systems and methods for controlling access to multimedia content are disclosed. In a first particular embodiment, a method is disclosed that includes receiving a request for multimedia content at a computing device. The method also includes retrieving a destination address of a mobile communication device related to an authorized user of the computing device, and determining whether the mobile communication device is located within a communicative distance from the computing device. When the mobile communication device is located within the communicative distance from the computing device, (e.g., close enough to communicate with the mobile communication device) the multimedia content is received at the computing device. When the mobile communication device is not located within the communicative distance from the computing device, the method includes transmitting an authorization-request message via a network to a destination address of the mobile communication device. The authorization-request message includes a request for authorization to receive the multimedia content at the computing device. Particular embodiments can be advantageously utilized in parental control to prevent viewing of unauthorized types of multimedia content or to prevent viewing multimedia content at unauthorized times.

In a second particular embodiment, a computer-readable medium is disclosed that includes operational instructions that, when executed by a processor, cause the processor to receive a request for multimedia content at the computer. The computer-readable medium further comprises operational instructions that, when executed by the processor, cause the processor to retrieve a plurality of destination addresses of a plurality of mobile communication devices, where each mobile communication device is related to an authorized user of the computer, and to determine whether at least one of the plurality of mobile communication devices is located within a predetermined distance from the computer. The computer-readable medium further comprises operational instructions that, when executed by the processor, cause the processor to receive the multimedia content at the computer when at least one of the plurality of mobile communication devices is located within the predetermined distance from the computer and to transmit a first authorization-request message via a network to a first destination address of the plurality of destination addresses when none of the plurality of mobile communication devices is located within the predetermined distance from the computer. The first authorization-request message includes a request for authorization to receive the multimedia content at the computer.

In a third particular embodiment, a set top box is disclosed that includes an input/output (I/O) interface to receive a request for multimedia content. The set top box also includes a proximity detector to determine whether a mobile communication device is located within a predetermined distance from the set top box. The set top box also includes an authorization module determine whether the request for the multimedia content is unauthorized according to a viewing profile related to a particular user of the set top box. The authorization module retrieves a destination address of a mobile communication device associated with an authorized user of the set top box and determines from the proximity detector whether the mobile communication device is located within a predetermined distance from the set top box. The authorization module receives the multimedia content at the set top box when the mobile communication device is located within the predetermined distance from the set top box. When the mobile communication device is not located within the predetermined distance from the set top box, the authorization module transmits an authorization-request message via a network to the destination address of the mobile communication device. The authorization-request message includes a request for authorization to receive the multimedia content at the set top box.

An authorized user (e.g., a parent) of a computing device (e.g., a set top box) may wish to control access to multimedia content at the computing device even when the authorized user is not within the vicinity of the computing device. For example, the authorized user may be shopping, may be at work, or may be in a different room than the computing device. If there are other users (e.g., children) at home that have access to the computing device, the authorized user may still desire to control access to multimedia content at the computing device. The authorized user may have created a passcode required to enable the computing device to receive certain multimedia content, such as multimedia content received via a particular "premium" channel. That is, a user may need to enter the passcode before the computing device is enabled to receive the multimedia content. However, a user may have learned the passcode and may enter the passcode in an attempt to view multimedia content via the particular "premium" channel.

Generally, when the authorized user's mobile communication device is within a predetermined distance from the computing device, the authorized user can monitor what multimedia content another user is viewing. Additionally, when an unauthorized user's mobile communication device is within the predetermined distance from the computing device, the unauthorized user may be the user requesting multimedia content so authorization would not be necessary. Accordingly, authorization is not needed when the authorized user's mobile communication device is within the predetermined distance from the computing device. However, when the authorized user's mobile communication device is not within the predetermined distance from the computing device, the authorized user is most likely not able to monitor what multimedia content another user is requesting. In this case, the computing device sends an authorization-request message to the authorized user's mobile communication device. The authorization-request message allows the authorized user to remotely control what multimedia content other users can view.

Referring to FIG. 1, an illustrative embodiment of a system 100 to control access to multimedia content is shown. The system 100 includes a computing device 102 connected to a network 130. The computing device 102 includes an input/output (I/O) interface 110 that is communicatively connected to an input device 114 and a display device 116. The I/O interface 110 is configured to receive a request (Req) 170 for multimedia content (MMC) 176. The computing device 102 also includes a proximity detector 108 and a memory 104. The proximity detector 108 is configured to determine whether a mobile communication device 120 (e.g., a cell phone or a personal digital assistant) is located within a predetermined distance 160 of the computing device 102. For example, the predetermined distance 160 may indicate that the mobile computing device 120 is in the same room (e.g., the predetermined distance 160 may be less than about 10 feet). As another example, the predetermined distance 160 may indicate that the mobile computing device 120 is in the same residence (e.g., the predetermined distance 160 may be less than about 50 feet). Additionally, the predetermined distance 160 may indicate that the mobile computing device 120 is very close to the computing device 102 (e.g., the predetermined distance 160 may be a few inches). In a particular embodiment, an authorized user of the computing device 102 may customize the predetermined distance 160 to the authorized user's particular preference. The predetermined distance 160 may be stored locally in and retrieved from memory 104. Alternatively, the predetermined distance 160 may be retrieved via the network 130. In a particular embodiment, the proximity detector 108 uses a short-range, high-frequency, wireless communication to determine whether the mobile communication device 120 is located within the predetermined distance 160 of the computing device 102. Examples of short-range, high-frequency, wireless communications are sometimes referred to as Near Field Communication (NFC) technology. In a particular embodiment, the proximity detector 108 uses a frequency-hopping-spread-spectrum radio signal to determine whether the mobile communication device 120 is located within the predetermined distance 160 of the computing device 102. For example, the frequency-hopping-spread-spectrum radio technology may include Bluetooth™ technology.

The memory 104 includes an authorization module 112 according to embodiments disclosed herein. The computing device 102 further includes a processor 106 that is coupled to the I/O interface 110, the proximity detector 108, and the memory 104. The processor 106 has access to the authorization module 112 and is configured to execute operational instructions of the authorization module 112. The authorization module 112 is configured to control access to multimedia content 176 receivable from a multimedia server 140 via the network 130. The computing device 102 communicates with the mobile communication device 120 via the network 130 and a via a public wireless network 150.

Figure 5:
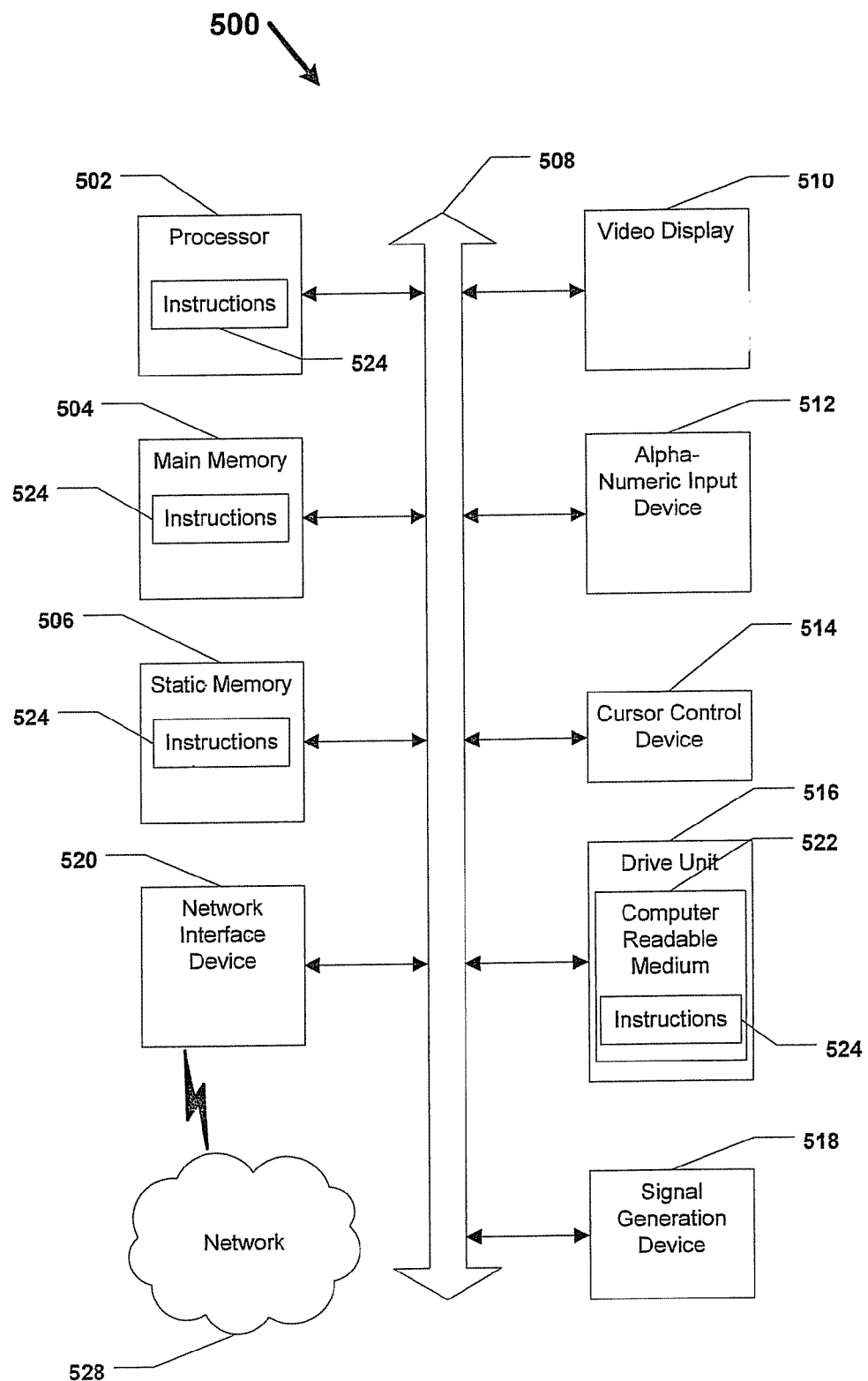
FIG. 5 is an illustration of an illustrative embodiment of a general computer system.

The computing device 102 may comprise a general computing device, such as the general computing device 500 illustrated in FIG. 5. For example, the computing device 102 may include a personal computer, a server, or a set top box.

During operation, a user 118 wishing to view multimedia content 176 sends a request 170 for the multimedia content 176. The request 170 is sent for the input device 114 to the I/O interface 110 in response to a command from the user 118 operating the input device 114. For example, the input device 114 may include a keyboard, a computer mouse, or a remote control device. In particular embodiments, the request 170 may be sent by the input device 114 in response to the user 118 operating the input device 114 to select a channel. In particular embodiments, the request 170 for multimedia content 176 includes a passcode to enable the computing device 102 to receive the multimedia content 176. For example, some multimedia services allow a subscriber to require a passcode to be entered by a user before the user can access certain "premium" channels. In particular embodiments, the passcode comprises a personal identification number (PIN) to identify a particular user.

After receiving the request 170 for the multimedia content 176, the computing device 102 retrieves a destination address (e.g., a telephone number or an email address) of the mobile communication device 120 associated with an authorized user of the computing device 102. In particular embodiments, the computing device 102 may retrieve the destination address from the memory 104. Alternatively, the computing device 102 may retrieve the destination address via the network 130 from the multimedia server 140 or from another device (e.g., a storage device) related to a multimedia service.

In particular embodiments, the authorized user associated with the mobile communication device 120 is a subscriber to a multimedia service that provides the multimedia content 176. The authorized user can enable the computing device 102 to receive the multimedia content 176. For example, the authorized user may be a parent that has subscribed to a multimedia service and wishes to prevent children from accessing particular multimedia content 176.

The computing device 102 determines whether the mobile communication device 120 is located within the predetermined distance 160 of the computing device 102. When the mobile communication device 120 is located within the predetermined distance 160 from the computing device 102 (as shown in FIG. 1, for example), the computing device 102 receives the multimedia content 176. Typically, when the mobile communication device 120 is within the predetermined distance 160, the authorized user associated with the mobile communication device 120 is sufficiently close to the computing device 102 to monitor what multimedia content 176 other users (e.g., children) view. Alternatively, when the mobile communication device 120 is within the predetermined distance 160, the authorized user associated with the mobile communication device 120 may be the user requesting the multimedia content 176.

When the mobile communication device 120 is not located within the predetermined distance 160 from the computing device 102, the computing device 102 transmits an authorization-request (A-Req) message 172 to the destination address of the mobile communication device 120. In a particular embodiment, the authorization-request message 172 comprises a telephone call transmitted to the mobile communication device 120 via the public wireless network 150. Alternately, the authorization-request message 172 may comprise, for example, an email message or a text message to the mobile communication device 120. In particular embodiments, the authorization-request message 172 includes a request for authorization to receive the multimedia content 176 at the computing device 102. The request for authorization may also include a request for information to authenticate an authorized user of the computing device 102. For example, the authorized user may be prompted to enter a PIN into the mobile communication device 120 to respond to the authorization-request message 172. Authenticating the authorized user at the mobile communication device 120 may help prevent an individual other than the authorized user (e.g., a child) from responding to the authorization-request message 172.

In particular embodiments, the computing device 102 receives a response (A-Resp) message 174 from the mobile communication device 120. The response message 174 includes a response to the request for authorization to receive the multimedia content 176 at the computing device 102. The computing device 102 receives the multimedia content 176 when the response to the request for authorization includes an authorization for the user 118 to receive the multimedia content 176. The computing device 102 does not receive the multimedia content 176 when the response to the request for authorization does not include an authorization for the user 118 to receive the multimedia content 176. In particular embodiments, the computing device 102 does not receive the multimedia content 176 if the computing device 102 does not receive the response message 174 within a predetermined amount of time after transmitting the authorization-request message 172. The predetermined amount of time may be a few seconds or may be a minute, among other alternatives. In a particular embodiment, the authorized user of the mobile communication device 120 selects a predetermined amount of time to meet the authorized user's particular preference.

Transmitting the authorization-request message 172 to the mobile communication device 120 provides the authorized user (e.g., the parent) with additional control of access to the multimedia content 176. For example, the authorized user may have created a passcode required to enable the computing device 102 to receive certain multimedia content 176, such as multimedia content received via a particular "premium" channel. That is, the user 118 may need to enter the passcode before the computing device 102 is enabled to receive the multimedia content 176. However, a child may have inadvertently learned the passcode and may have entered the passcode in an attempt to view multimedia content 176 via the particular "premium" channel. The parent can prevent the child from viewing the multimedia content 176, even though the passcode has been entered, by transmitting the response message 174 that does not include an authorization to receive the multimedia content 176 at the computing device 102. In this manner, the parent can prevent the child from viewing the multimedia content 176 even when the parent is not at home.

Figure 2:
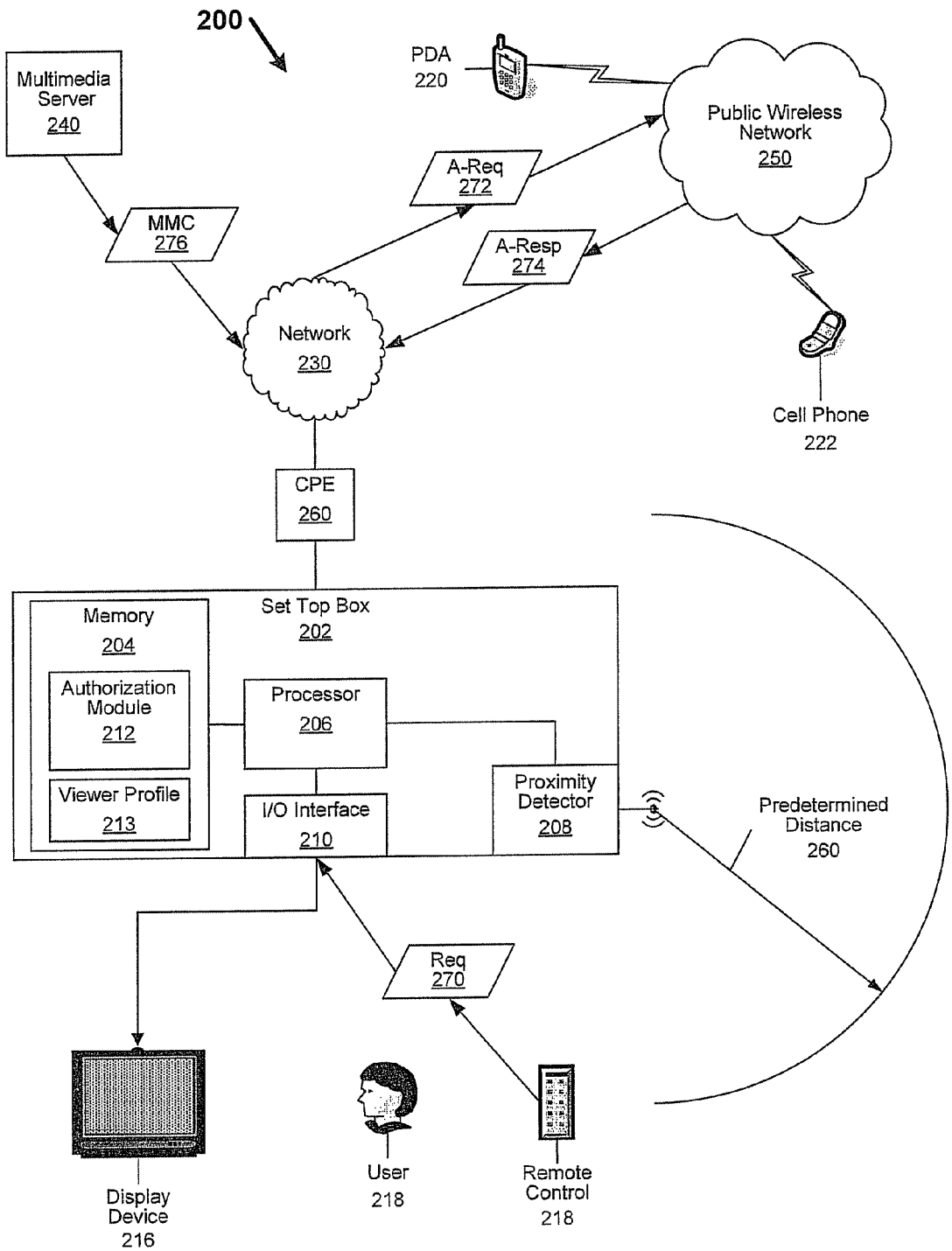
FIG. 2 is a diagram of an embodiment of a system to control access to multimedia content at a set top box.

Referring to FIG. 2, an illustrative embodiment of a system 200 to control access to multimedia content is shown. The system 200 includes a set top box 202 connected to customer premises equipment (CPE) 260. The CPE 260 is connected to a network 230, such as an Internet Protocol Television (IPTV) access network. The CPE 260 may include routers, local area network devices, modems, such as digital subscriber line (DSL) modems, any other suitable devices for facilitating communication between the set top box 202 and the network 230, or any combination thereof. The set top box 202 includes an input/output (I/O) interface 210 that is communicatively coupled to a remote control 214 and a display device 216. The I/O interface 210 is configured to receive a request 270 for multimedia content 276.

The set top box 202 also includes a proximity detector 208 and a memory 204. The proximity detector 208 is configured to determine whether a mobile communication device (e.g., a personal digital assistant (PDA) 220 or a cell phone 222) is located within a predetermined distance 260 of the set top box 202. In a particular embodiment, the proximity detector 208 uses a short-range, high-frequency, wireless communication to determine whether at least one mobile communication device 220, 222 is located within the predetermined distance 260 of the set top box 202. Examples of short-range, high-frequency, wireless communications are sometimes referred to as Near Field Communication (NFC) technology. In a particular embodiment, the proximity detector 208 uses a frequency-hopping-spread-spectrum radio signal to determine whether at least one mobile communication device 220, 222 is located within the predetermined distance 260 of the set top box 202. For example, the frequency-hopping-spread-spectrum radio technology may include Bluetooth™ technology, for example.

The memory 204 includes an authorization module 212 according to embodiments disclosed herein. The memory 204 also includes a viewer profile 213. Alternately, the viewer profile 213 may be included in the authorization module 212. In particular embodiments, the viewer profile 213 includes information indicating which multimedia content 276 a particular user is authorized to view. For example, the viewer profile 213 may include particular channels that a user 218 does not need authorization to view. Additionally, the viewer profile 213 may include ratings of multimedia content that the user 218 does not need authorization to view. In particular embodiments, the user 218 may request these channels without receiving further authorization. However, if the user 218 requests a channel that is not included in the viewer profile 213, the set top box 202, in accordance with embodiments disclosed herein, transmits an authorization-request (A-Req) message 272 to at least one mobile communication device (e.g., the PDA 220 or the cell phone 222) when the mobile communication devices 220, 222 are not within the predetermined distance 260 to determine whether to receive the multimedia content 276. The viewer profile 213 may also include times during which a particular user may view multimedia content 276. For example, the user 218 may wish to view the multimedia content 276 during a time period (e.g., from 10:00 pm to 8:00 am) that is not included in the viewer profile 213. In particular embodiments, when the user 218 requests multimedia content 176 at a time that is not included in the viewer profile 213, the set top box 202 transmits an authorization-request message 272 to at least one mobile communication device 220, 222 to determine whether to receive the multimedia content 276.

The set top box 202 further includes a processor 206 that is connected to the I/O interface 210, the proximity detector 208, and the memory 204. The processor 206 has access to the authorization module 212 and is configured to execute operational instructions in the authorization module 212. The authorization module 212 is configured to control access to the multimedia content 276 receivable from a multimedia server 240 via the network 230.

The set top box 202 communicates with the mobile communication devices 220, 222 via a network 230 and via a public wireless network 250. The public wireless network 250 is configured to enable the set top box 202 to send the authorization-request message 272 to the mobile communication devices 220, 222 via the network 230. The public wireless network 250 is also configured to enable the mobile communication devices 220, 222 to send a response message (A-Resp) 274 to the set top box 202 via the network 230.

During operation, a user 218 sends a request (Req) 270 for the multimedia content 276. The request 270 is sent from the remote control 214 to the I/O interface 210 in response to the user 218 operating the remote control 214. The request 270 may be sent by the remote control 214 in response to the user 218 operating the remote control 214 to select a channel or to request downloaded content, for example. In particular embodiments, the request 270 for multimedia content 276 includes a passcode to enable the set top box 202 to receive the multimedia content 276.

After receiving the request 270 for the multimedia content 276, the set top box 202 retrieves one or more destination addresses of one or more mobile communication devices (e.g., the PDA 220 or the cell phone 222). Each mobile communication device 220, 222 is associated with an authorized user of the set top box 202. In particular embodiments, the set top box 202 may retrieve the destination addresses from the memory 204. Alternately, the set top box 202 may retrieve the destination addresses via the network 230 from the multimedia server 240 or from another device related to a multimedia service, for example.

The set top box 202 utilizes the proximity detector 208 to determine whether one of the mobile communication devices 220, 222 is located within a predetermined distance 260 of the set top box 202. When at least one of the mobile communication devices 220, 222 is located within the predetermined distance 260 from the set top box 202, the set top box 202 receives the multimedia content 276. When none of the mobile communication devices 220, 222 are located within the predetermined distance 260 from the set top box 202 (as shown in FIG. 2, for example), the set top box 202 transmits a first authorization-request message 272 via the network 230 and the public wireless network 250 to a first destination address (e.g., a destination address for either the PDA 220 or the cell phone 222). In particular embodiments, the authorization-request message 272 includes a rating of the requested multimedia content 276. In particular embodiments, the authorization-request message 272 includes a subject matter description of the requested multimedia content 276.

The set top box 202 receives a response message 274 from a mobile communication device at the first destination address (e.g., a first device, such as the PDA 220 or the cell phone 222) via the network 230. The set top box 202 determines whether the response message 274 includes an authorization to receive the multimedia content 276 at the set top box 202. The set top box 202 receives the multimedia content 276 when the response message 274 includes an authorization to receive the multimedia content 276 at the set top box 202.

In particular embodiments, the set top box 202 transmits a second authorization-request message 272 via the network 230 to a second destination address when a predetermined amount of time has elapsed after transmitting the first authorization-request message 272 to the first destination address without receiving a response message 274 from the first destination address. For example, the set top box 202 may transmit a first authorization-request message 272 to the PDA 220 and then transmit a second authorization-request message 272 to the cell phone 222 when a predetermined amount of time has elapsed after transmitting the first authorization-request message 272 without receiving a response message 274 from the PDA 220. In particular embodiments, the set top box 202 receives a response message 274 from a mobile communication device at the second destination address (e.g., a second device, such as the PDA 220 or the cell phone 222) via the network 230. The set top box 202 receives the multimedia content 276 when the response message 274 includes an authorization to receive the multimedia content 276 at the set top box 202.

Figure 3:
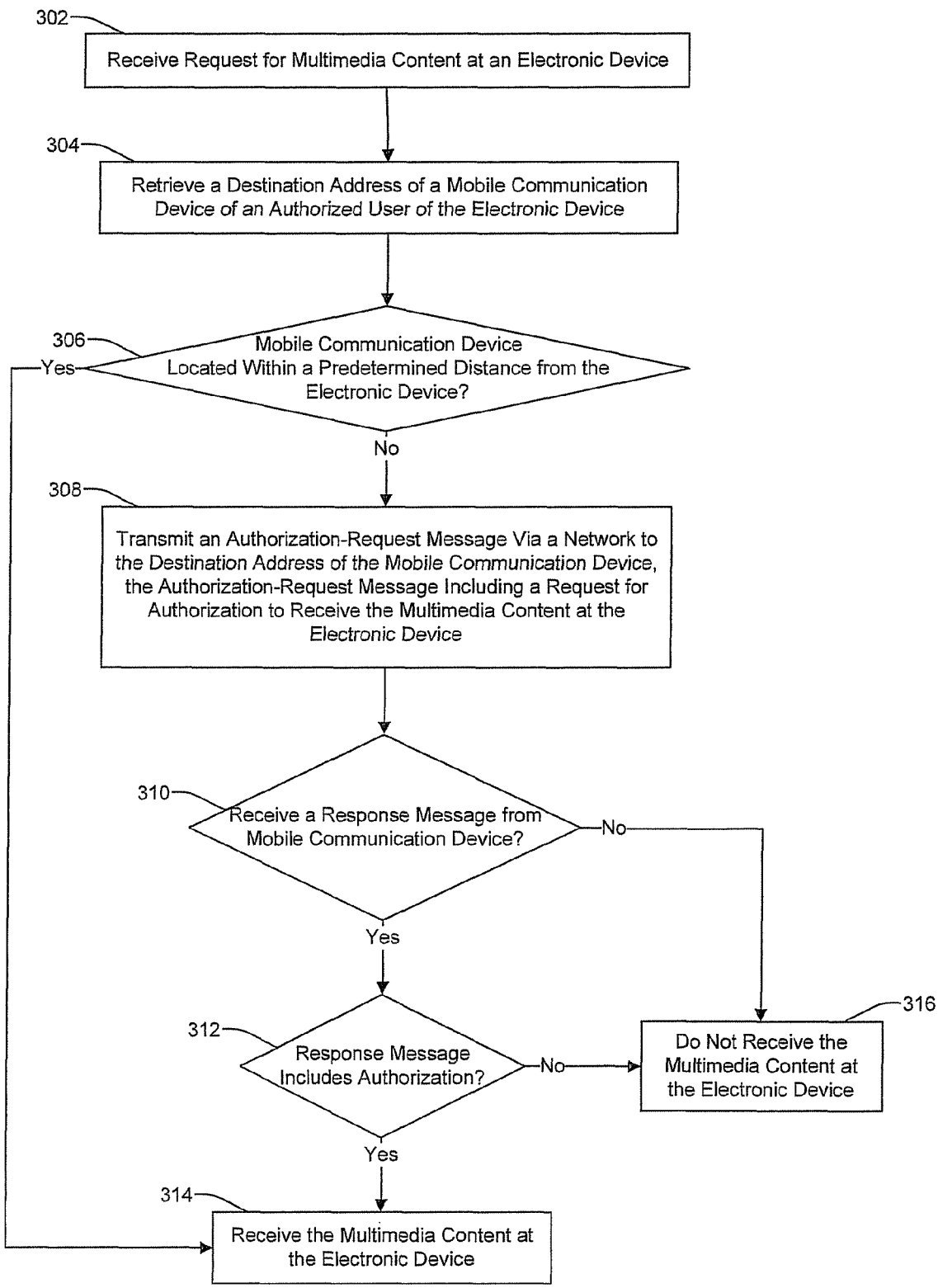
FIG. 3 is a flow chart of a first particular embodiment of a method of controlling access to multimedia content.

FIG. 3 depicts a flow chart of a particular embodiment of a method 300 of controlling access to multimedia content. The method 300 can be performed, for example, by electronic devices such as the computing device 102 of FIG. 1 and the set top box 202 of FIG. 2. The electronic device performing the method 300 receives a request for multimedia content, at 302. The request for multimedia content may be generated, for example, in response to a user using an input device (e.g., a keyboard, a computer mouse, or a remote control) to enter input to a user interface. In particular embodiments, the request for multimedia content is generated in response to the user selecting multimedia content from a list of multimedia content displayed on a display device. Alternately, the request for multimedia content may be generated, for example, in response to the user selecting a channel on a set top box.

Advancing to 304, the electronic device retrieves a destination address of a mobile communication device (e.g., the mobile communication device 120 of FIG. 1) related to an authorized user of the electronic device. The electronic device determines whether the mobile communication device is located within a predetermined distance from the electronic device, at 306. When the mobile communication device is located within the predetermined distance from the electronic device, the method 300 advances to 314 and the electronic device receives the multimedia content. When the mobile communication device is not located within the predetermined distance from the electronic device, the method 300 advances to 308 and the electronic device transmits an authorization-request message via a network to the destination address of the mobile communication device. The authorization-request message includes a request for authorization to receive the multimedia content at the electronic device. Example authorization-request messages 172, 272 are shown in FIG. 1 and FIG. 2.

The electronic device determines whether a response message is received from the mobile communication device, at 310. Example response messages 174, 274 are shown in FIG. 1 and FIG. 2. If the electronic device does not receive a response message, the method 300 advances to 316 and the electronic device does not receive the multimedia content. If the electronic device receives a response message from the mobile communication device, the method 300 advances to 312 and the electronic device determines whether the response message includes an authorization to receive the multimedia content. If the response message does not include an authorization to receive the multimedia content at the electronic device, the method 300 advances to 316 and the electronic device does not receive the multimedia content. If the response message includes an authorization to receive the multimedia content at the electronic device, the method 300 advances to 314 and the electronic device receives the multimedia content.

Figure 4:
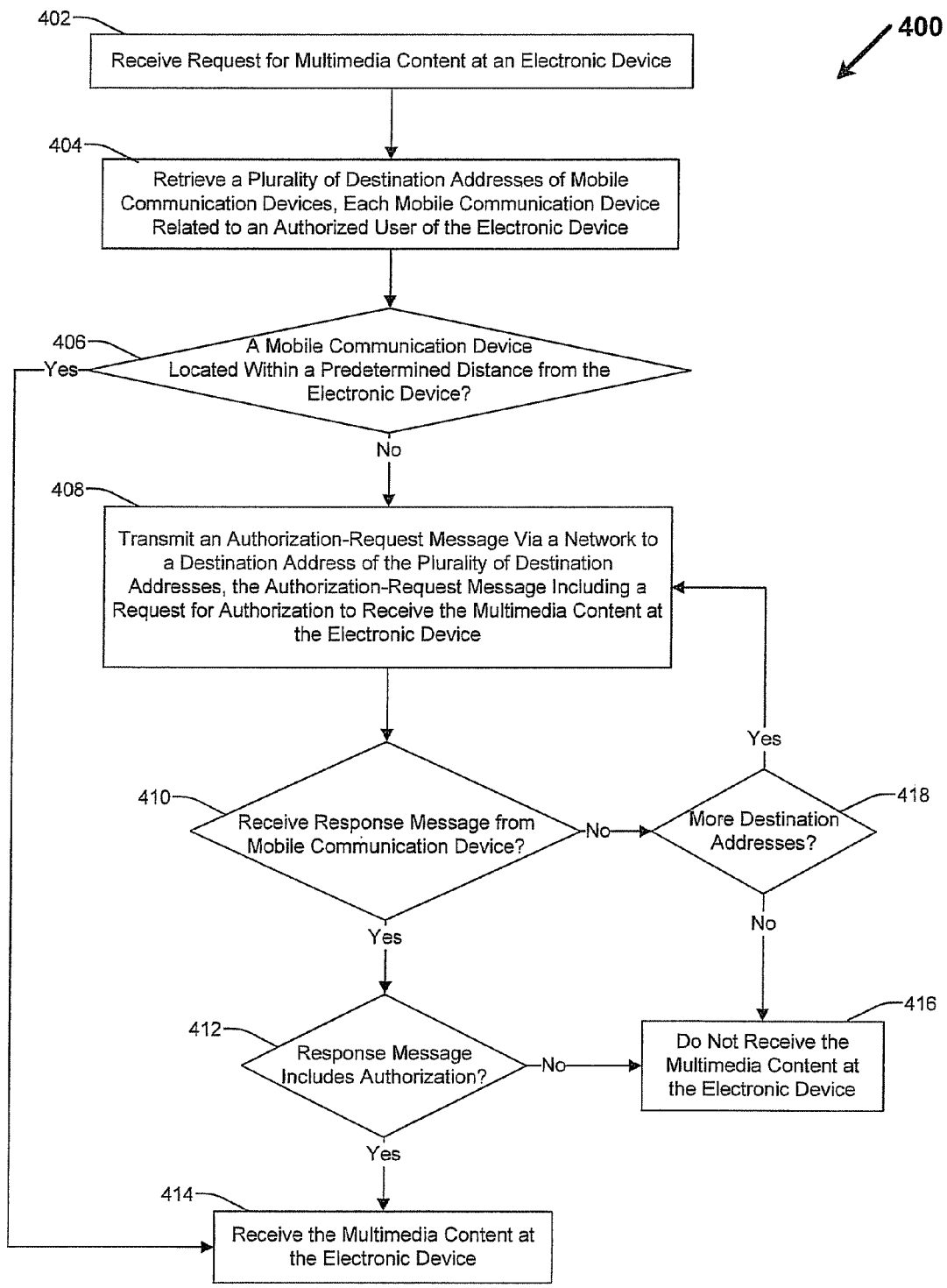
FIG. 4 is a flow chart of a second particular embodiment of a method of controlling access to multimedia content.

FIG. 4 depicts a flow chart of a particular embodiment of a method 400 of controlling access to multimedia content. The method 400 can be performed, for example, by electronic devices such as the computing device 102 of FIG. 1 and the set top box 202 of FIG. 2.

The electronic device performing the method 400 receives a request for multimedia content, at 402. Advancing to 404, the electronic device retrieves a plurality of destination addresses of mobile communication devices. Each mobile communication device is associated with an authorized user of the electronic device. Example mobile communication devices include the PDA 220 and the cell phone 222 of FIG. 2. The electronic device determines whether at least one of the plurality of mobile communication devices is located within a predetermined distance from the electronic device, at 406.

When at least one of the plurality of mobile communication devices is located within the predetermined distance from the electronic device, the method 400 advances to 414 and the electronic device receives the multimedia content. When none of the mobile communication devices are located within the predetermined distance from the electronic device, the method 400 advances to 408 and the electronic device transmits an authorization-request message via a network to one destination address of the plurality of destination addresses. The authorization-request message includes a request for authorization to receive the multimedia content at the electronic device. Example authorization-request messages 172, 272 are shown in FIG. 1 and FIG. 2.

The electronic device determines whether a response message is received from a mobile communication device, at 410. Example response messages 174, 274 are shown in FIG. 1 and FIG. 2. If the electronic device does not receive a response message, the method 400 advances to 418 and the electronic device determines whether there are other destination addresses which to send an authorization-request message. If no more destination addresses remain, the method 400 advances to 416 and the electronic device does not receive the multimedia content. If one or more destination addresses remain, the electronic device advances back to 408.

If the electronic device does receive a response message, the method 400 advances to 412 and the electronic device determines whether the response message includes an authorization to receive the multimedia content at the electronic device. If the response message does not include an authorization to receive the multimedia content at the electronic device, the method 400 advances to 416 and the electronic device does not receive the multimedia content. If the response message does include an authorization to receive the multimedia content at the electronic device, the method 400 advances to 414 and the electronic device receives the multimedia content.

Embodiments disclosed herein provide for a user of an electronic device to have selective access based on control of an authorized user, such as a parent, of the electronic device. In particular embodiments, a parent can refuse to authorize particular multimedia content even when a child has inadvertently learned a passcode required to enable the electronic device to receive the multimedia content. The parent can refuse the authorization even when the parent is not within the vicinity of the electronic device, such as when the parent has left the home to go shopping, go to work, etc.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. For example, the computer system may include instructions of the authorization modules 112, 212 shown in FIG. 1 and FIG. 2 to perform the methods 300, 400 shown in FIG. 3 and FIG. 4. The computer system 500 may be connected to other computer systems or peripheral devices via a network, such as the network 130 shown in FIG. 1 or the network 230 shown in FIG. 2. The computer system 500 may include or be included within, for example, computing devices and set top boxes, as shown in FIG. 1 and FIG. 2.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), a projection television display, a flat panel display, a plasma display, a solid state display, or a cathode ray tube (CRT). Additionally, the computer system 500 may include an input device 512, such as a remote control device having a wireless keypad, a keyboard, a microphone coupled to a speech recognition engine, a camera such as a video camera or still camera, or a cursor control device 514, such as a mouse device. The computer system 500 can also include a disk drive unit 516, a signal generation device 518, such as a speaker or a remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods, such as method 300 and method 400, or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

The present disclosure contemplates a computer-readable medium that includes instructions 524 or receives and executes instructions 524 responsive to a propagated signal; so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the true spirit and scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a set top box device, a first request to access multimedia content;
   determining a communicative distance between the set top box device and a mobile communication device associated with a user;
   performing a comparison of the communicative distance to a threshold distance to determine whether the mobile communication device is located within the threshold distance from the set top box device, wherein the threshold distance is defined by the user;
   determining whether to automatically grant authorization for the first request to access the multimedia content based on the comparison, wherein authorization for the first request to access the multimedia content is automatically granted in response to determining that the mobile communication device is located within the predetermined communicative threshold distance from the set top box device, and wherein authorization for the first request to access the multimedia content is not automatically granted in response to determining that the mobile communication device is not located within the threshold distance from the set top box device; and
   in response to determining that authorization for the first request to access the multimedia content is not automatically granted based on the comparison and in response to determining that the first request to access the multimedia content is received during a particular time period, transmitting, from the set top box device, a second request to the mobile communication device via a network, wherein the second request is for authorization to access the multimedia content at the set top box device.

2. The method of claim 1, wherein the multimedia content corresponds to a television channel, and wherein the first request is sent in response to accessing the television channel.

3. The method of claim 1, further comprising, in response to determining that the first request to access the multimedia content is not received during the particular time period, denying authorization for the first request to access the multimedia content, wherein the particular time period is identified in a viewing profile that is related to a particular user of the set top box device.

4. The method of claim 1, wherein the second request is sent by a message that includes a first content rating of the multimedia content, wherein the first content rating is different than a second content rating that is identified in a viewing profile associated with a particular user, and wherein the particular user is authorized to access the multimedia content when the multimedia content has the second content rating.

5. The method of claim 1, wherein the second request is sent by a message that includes one of a start time of the multimedia content and a duration of the multimedia content.

6. The method of claim 1, wherein the second request is sent by a message that includes a subject matter description of the multimedia content.

7. The method of claim 1, further comprising:
   receiving a response from the mobile communication device in response to the second request, wherein the response indicates that authorization for the second request is denied; and
   denying the authorization for the second request in response to receiving the response.

8. The method of claim 1, further comprising granting authorization for the second request in response to receiving a response from the mobile communication device indicating that the authorization for the second request is granted.

9. The method of claim 1, further comprising denying authorization for the first request based on a response to the second request received from the mobile communication device, wherein the first request includes a correct parental passcode.

10. A computer-readable storage device comprising instructions that, when executed by a processor, cause the processor to perform operations comprising:
    receiving, at a set top box device, a first request to access multimedia content;
    determining a communicative distance between a first mobile communication device of a plurality of mobile communication devices and the set top box device, wherein the plurality of mobile communication devices is associated with a user;

performing a comparison of the communicative distance to a threshold distance to determine whether the first mobile communication device is located within the threshold distance from the set top box device, wherein the threshold distance is defined by the user;

determining whether to automatically grant authorization for the first request to access the multimedia content based on the comparison, wherein authorization for the first request to access the multimedia content is automatically granted in response to determining that the first mobile communication device is located within the threshold distance from the set top box device, and wherein authorization for the first request to access the multimedia content is not automatically granted in response to determining that none of the plurality of mobile communication devices is located within the threshold distance from the set top box device; and in response to determining that authorization for the first request to access the multimedia content is not automatically granted based on the comparison and in response to determining that the first request to access the multimedia content is received during a particular time period, transmitting, from the set top box device, a second request to the first mobile communication device via a network, wherein the second request is for authorization to access the multimedia content at the set top box device.

11. The computer-readable storage device of claim 10, wherein the second request is sent by a message that includes authentication information associated with the user.

12. The computer-readable storage device of claim 11, wherein the authentication information includes personal identification information.

13. The computer-readable storage device of claim 10, wherein the operations further comprise granting authorization for the second request in response to determining that a response to the second request includes a grant of authorization to access the multimedia content, wherein the response is received, via the network, from the first mobile communication device.

14. The computer-readable storage device of claim 10, wherein the operations further comprise, in response to determining that a first response is not received from the first mobile communication device after a threshold amount of time has elapsed after sending the second request, requesting authorization from the user by transmitting, via the network to a second mobile communication device of the plurality of mobile communication devices, a third request for authorization to access the multimedia content at the set top box device.

15. The computer-readable storage device of claim 14, wherein the operations further comprise granting authorization for the third request in response to determining that a second response to the third request includes a grant of authorization to access the multimedia content, wherein the second response is received, via the network, from the second mobile communication device.

16. The computer-readable storage device of claim 10, wherein the set top box device includes the processor and a memory accessible to the processor.

17. The computer-readable storage device of claim 10, wherein the operations further comprise:

receiving, at the set top box device, a correct parental passcode, wherein the correct parental passcode is included in the first request, and wherein authorization for the first request is not automatically granted based on the correct parental passcode; and denying authorization for the first request in response to receiving a response from the first mobile communication device indicating that authorization for the second request is denied.

18. A set top box device comprising:

a processor; and a memory accessible to the processor, the memory including instructions that, when executed by the processor, cause the processor to perform operations comprising:

receiving a first request to access multimedia content;

determining a communicative distance between the set top box device and a mobile communication device associated with a user;

performing a comparison of the communicative distance to a threshold distance to determine whether the mobile communication device is located within the threshold distance, wherein the threshold distance is defined by the user;

determining whether to automatically grant authorization for the first request to access the multimedia content based on the comparison, wherein authorization for the first request is automatically granted in response to determining that the mobile communication device is located within the threshold distance from the set top box device, and wherein authorization for the first request to access the multimedia content is not automatically granted in response to determining that the mobile communication device is not located within the threshold distance from the set top box device; and in response to determining that authorization for the first request to access the multimedia content is not automatically granted based on the comparison and in response to determining that the first request to access the multimedia content is received during a particular time period, transmitting a second request to the mobile communication device via a network, wherein the second request is for authorization to access the multimedia content at the set top box device.

19. The set top box device of claim 18, wherein the mobile communication device includes one of a mobile phone and a personal digital assistant.

20. The set top box device of claim 18, wherein the second request is sent by a message that includes an identification of a particular channel that presents the multimedia content.

21. The set top box device of claim 20, wherein the first request to access the multimedia content includes security access information to enable the set top box device to access the multimedia content via the particular channel.

22. The set top box device of claim 21, wherein the security access information comprises a personal identification number.

23. The set top box device of claim 18, wherein a short-range, high-frequency, wireless communication is transmitted to the mobile communication device to determine the communicative distance.

24. The set top box device of claim 18, wherein a frequency-hopping-spread-spectrum radio signal is used to determine the communicative distance.

* * * * *